United States Patent Office 3,349,107
Patented Oct. 24, 1967

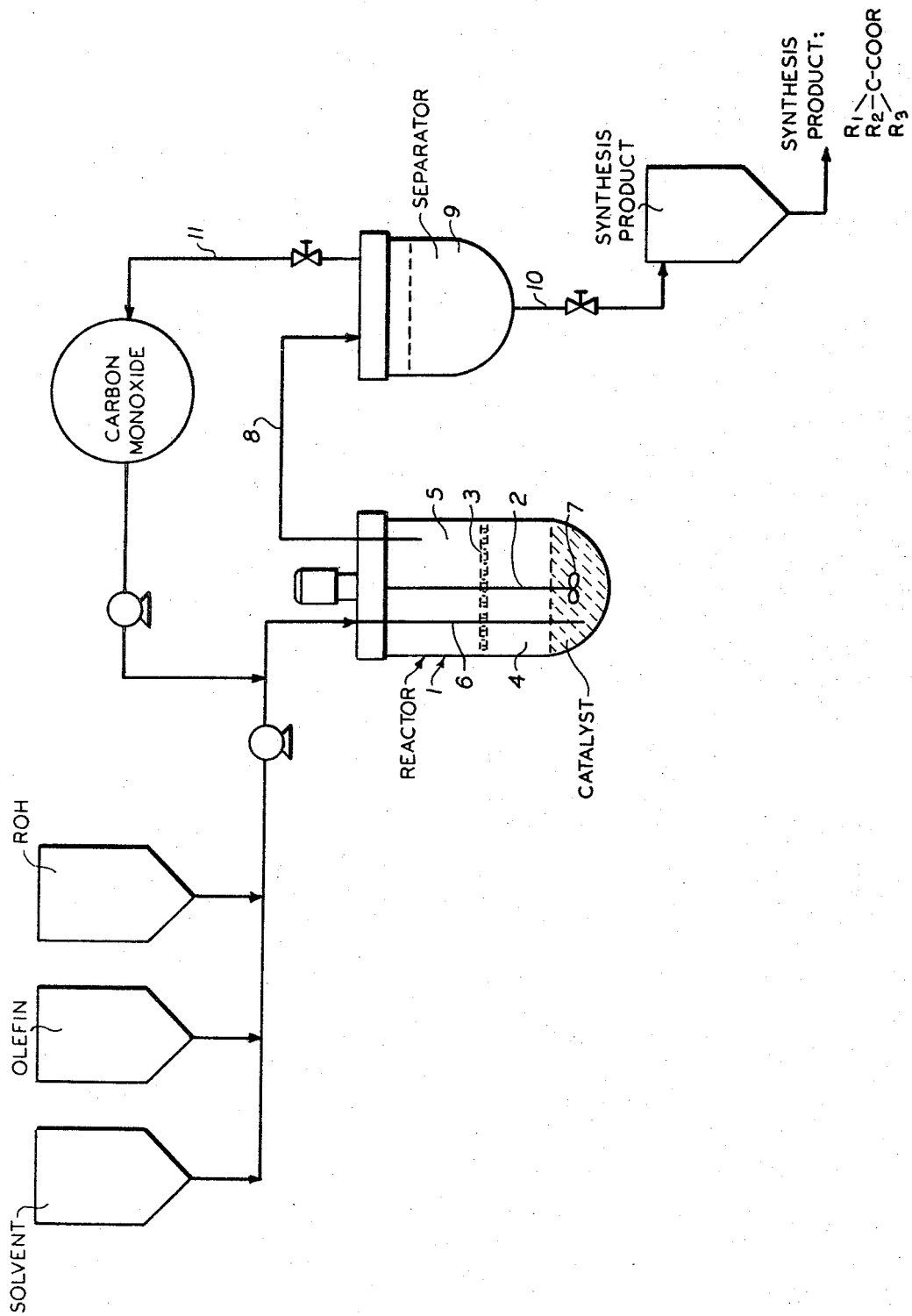

3,349,107
PROCESS FOR PREPARING CARBOXYLIC ACIDS
AND THEIR ALKYL-ESTERS
Stephan Pawlenko, Bochum, Germany, assignor to
Schering Aktiengesellschaft, Berlin, Germany
Filed Nov. 16, 1965, Ser. No. 508,091
8 Claims. (Cl. 260—410.9)

This application is a continuation-in-part of copending application Ser. No. 203,212 filed June 18, 1962, now abandoned.

The invention relates to the synthesis of carboxylic acids and their methylesters from olefins, carbon monoxide and —OH— containing compounds ROH, wherein R stands for H or $CH_3$. According to the process of the invention such syntheses can be carried out as a one-step process and with catalytic amounts of oxoniumtetrafluoroborate $[ROH_2][BF_4]$.

It was known prior to the present invention to prepare carboxylic acids and their esters from olefins, carbon monoxide and said ROH compounds in the presence of various Lewis-acids, particularly those based on $BF_3$. It was known that in an acid medium olefins yield with the addition of proton and CO, as an intermediate, acyl-ions of the general formula

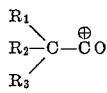

As the carbonyl-oxygen is one of the best electron donors for $BF_3$, said acyl-ion reacts with the anion of the Lewis-acid with the formation of a stable $BF_3$-complex:

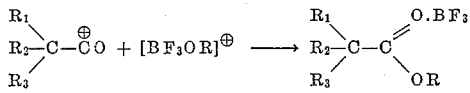

One mol of the Lewis-acid is always firmly bound to a complex by one mol of the synthesized carboxylic acid (or carboxylic acid ester). In order to split this complex to its components it is necessary to remove it from the reaction space, so that in said known processes the use of the catalyst in stoichiometric proportion and carrying out the synthesis in two separate steps—i.e., the synthesis proper and splitting of the complex—is unavoidable.

In the syntheses according to the present invention it has been found that hydroxoniumtetrafluoroborate $[H_3O][BF_4]$ and methoxoniumtetrafluoroborate $$[CH_3OH_2][BF_4]$$

do not show the properties and behavior of the Lewis-acids and their catalytic activity is effected exclusively by the oxonium-ion $[ROH_2]^\oplus$ in which R stands for H or $CH_3$. In this catalytic activity, the $[BF_4]^\ominus$-anion, which is coordinately neutral and has no tendency of complex-formation, is the ideal partner of the $[ROH_2]^\oplus$-cation.

$[H_3O][BF_4]$ and $[CH_3OH_2][BF_4]$ are well defined, ionogen structures which exist in solid and liquid condition only. They are thermally decomposed above 75° C. and this decomposition increases when the temperature is increased. Their existence can not be detected in the vapor phase.

$[H_3O][BF_4]$ has a melting point of +52° C. It contains 71.83% by weight of F, 10.22% by weight of B, 15.12% by weight of O and 2.83% by weight of H. It is easily soluble in water and forms hydrate compounds with water. $[H_3O][BF_4] \cdot H_2O$ has a melting point of −34° C.; $[H_3O][BF_4] \cdot 2H_2O$ melts at −54° C.; $[H_3O][BF_4] \cdot 4H_2O$ has a transition temperature of −80° C. Its slight hydrolysis in water, which occurs in dilute aqueous solutions, is completely absent at concentrations above 74.6% by weight of $[H_3O][BF_4]$.

$[CH_3OH_2][BF_4]$ has a melting point of +10.2° C. and contains 63.44% F, 9.02% B, 13.35% O, 4.18% H and 10.01% C., by weight. It is well soluble in methanol and yields solvate compounds $[CH_3OH_2][BF_4] \cdot CH_3OH$, having a melting point of −41° C.;

$$[CH_3OH_2][BF_4] \cdot 2CH_3OH$$

having a melting point of −52° C.;

$$[CH_3OH_2][BF_4] \cdot 4CH_3OH$$

having a transition temperature of −96° C. Its slight solvolysis in dilute solution is completely absent at concentrations above 65.2% by weight of $[CH_3OH_2][BF_4]$.

It has been found that the synthesis according to the present invention can be carried out under mild conditions, i.e. in the range of 20–50° C. and under a pressure in the range of 50–200 atmospheres of CO-pressure. As the reaction takes place practically instantaneously and the resulting carboxylic acids and their esters are not miscible with the catalysts used according to the invention, the synthesis is carried out as a one-step process, in batches, as well as fully continuously.

An apparatus adapted to carry out the process of the invention is diagrammatically illustrated in the appended drawing.

In the drawing, a pressure reactor 1 is provided with a stirrer 2 and a perforated partition 3. This partition, which allows passage of fluid and gas in both directions, divides the reactor into an intensively stirred lower part 4 and an upper part 5, which is almost without stirring. At the start of the synthesis, the reactor is filled to $\frac{1}{10}$–$\frac{1}{4}$ of its volume with catalyst. Olefin (which may or may not contain a diluent), water, methanol and CO, are introduced into the reaction space through a conduit 6 which extends to near the bottom of reactor 1. The paddle of the stirrer is located directly above the bottom of the reactor. In the lower part of the reactor two liquid phases are intimately mixed, i.e. (a) the phase of catalyst+ROH and (b) the phase consisting of olefin, solvent, carboxylic acid (and/or its ester) and a gaseous phase (CO) and thereby carboxylic acid (and its ester) are continuously synthetized. First the lower part 4 and subsequently the upper part 5 of the reactor is filled. The upper part is connected by an overflow tube 8 with a pressure vessel separator 9. As soon as the level of the overflow tube 8 is reached, the product of the synthesis flows continuously from the upper part 5 of the reactor into separator 9. Synthetized carboxylic acid (as well as its ester), solvent used, unreacted olefin and some of the catalyst, rise through perforated partition 3 upward. However, in the absence of mixing above said partition, said components form a uniform phase which is insoluble in oxonium-tetrafluoroborate. There is scarcely an effect of the stirrer above the partition, and the two liquid phases separate there. The heavy catalyst flows under the effect of gravity downward to the lower part 4 of the reactor and further participates in the synthesis. The light organic phase and excess CO pass upward and pass to separator 9. The synthesis product is discharged from the latter, while CO can be reintroduced into the synthesis process through conduit 11.

The following examples illustrate some embodiments of the invention, to which the invention is not limited.

*Example 1*

In a pressure reactor 1 of 2 liters shown in the appended drawing and described above, 435 g. catalyst consisting of 80.3% by weight of $[H_3O][BF_4]$, 19.4% by weight of water and 0.3% by weight of HF were placed. Into said pressure reactor within 130 hours 50,400 kg. (300 mols) of propylenetetramer and 5,310 kg. of $H_2O$ were continuously introduced, keeping the reaction temperature constantly at 45° C. and the CO-pressure at 150 atmospheres. The reaction product discharged through 10 during this period of time yielded 61,630 kg. of $C_{13}$-carboxylic acid having a boiling point$_{20}$ 167 to 182° C., an acid number of 263, $n_D^{20}=1.4478$ and also 0.740 kg. of higher carboxylic acids. This corresponds to a yield of 96% by weight, based on the theoretical yield. As in carrying out the synthesis in the manner described above in connection with the drawing in the average 9.6 g. [$H_3O$][$BF_4$] and 3 g. of HF were carried over by the synthesis product, the crude synthesis product was always subjected to preliminary washing with feed water so that said carried over products were continuously reintroduced through 3 into reactor 1. During the 130 hours of the synthesis reaction only 10 g. of fresh HF of 63% by weight and no additional catalyst at all were introduced into the reactor 1. At the end of the 130 hours period of the reactor contained 403 g. of catalyst consisting of 80.7% by weight of [$H_3O$][$BF_4$], 18.9% by weight of $H_2O$ and 0.4% by weight of HF. The losses of catalyst amounted to 0.4 g. of [$H_3O$][$BF_4$] and 0.15 g. of HF per 1 kg. of pure $C_{13}$-carboxylic acid.

In purifying the synthesis product, 3 parts by weight of the crude acid were diluted with 1 part by weight of n-heptane and treated with 85 g. of feed water per 1 kg. of crude acid. Subsequently, the crude acid was washed with NaCl-containing water, up to a pH of 4–5. As no olefine polymerizates or other by-products were present, any processing over the alkali salt was unnecessary. The washed crude acid was subjected to distillation and yielded n-heptane at 50 Torr and the $C_{13}$-carboxylic acid at 20 Torr.

*Example 2*

Using a catalyst described in the above Example 1, in the proportion and in the manner described in the above Example 1, into the pressure reactor 1 of 2 liters shown in the drawing 23,565 kg. (187 mols) of trimer propylene and 3,210 kg. of $H_2O$ were continuously introduced and reacted under the conditions stated in the above Example 1. From the reaction product obtained likewise in an analogous manner 29,492 kg. $C_{10}$-carboxylic acid, corresponding to a yield of 94% by weight of the theory, having a B.P.$_{20}$ 145 to 153° C., an acid number of 324, $n_D^{20}$ 1.4385 and 0.406 kg. of higher carboxylic acids were obtained.

*Example 3*

In a procedure equal to that described in the above Example 1, 330 g. of a catalyst consisting of 76.0% by weight of [$H_3O$][$BF_4$] and 24.0% by weight of $H_2O$ were placed in the reactor shown in the drawing, into which 9,610 kg. (114.2 mols) of 2-methylpentene-1 and 1.644 kg. of $H_2O$ were continuously introduced within 55 hours at 40–45° C. and under a CO-pressure of 100–150 atmospheres. During this period of time 13,620 kg. of crude synthesis product were continuously discharged from the reactor. Processing of this acid yielded 11,944 kg. (i.e., 91.9 mols corresponding to a yield of 80.3% of the theory) of pure α,α-dimethyl-valeric acid having a B.P.$_{20}$ 110° C., an acid number of 430 and $n_D^{20}$ 1.4210. In addition, 972 g. olefine polymerizates and 358 g. of higher carboxylic acids were obtained. Preliminary washing with feed water was carried out in the manner described in the above Example 1. At the end of the reaction period of 155 hours, the reactor contained 294 g. of catalyst consisting of 77.2% by weight of [$H_3O$][$BF_4$] and 22.8% by weight of water. The losses of catalyst amounted to 2.6 g. of [$H_3O$][$BF_4$] per kg. of pure α,α-dimethylvaleric acid.

*Example 4*

Using the same procedure as in the above Example 1, in the pressure reactor 1 shown in the drawing, 450 g. of catalyst consisting of 76.2% by weight of [$H_3O$][$BF_4$], 0.2% by weight of HF and 23.6% by weight of $H_2O$ were placed. Within a reaction time of 86 hours 13,442 kg. (240 mols) of isobutylene, 8.065 kg. of n-heptane, 3.924 kg. of $H_2O$ and 0.075 kg. of HF were introduced continuously at 40–42° C. and under 140–150 atmospheres CO-pressure. During this reaction period 31.552 kg. of the synthesis product were discharged in the manner described in the above Example 1.

The undiluted product was washed with feed water, then washed with NaCl-containing water up to a pH of 4–5 and subjected to fractional distillation. 7,980 kg. of n-heptane were thus recovered. Furthermore, 20,297 kg. (199 mols) of pure trimethylacetic acid having an acid number of 548, boiling point$_{760}$ 164° C., melting point +35° C. were obtained, corresponding to a yield of 82.9% of the theory. In addition, 2,460 kg. of higher carboxylic acids having an acid number of 336 and $n_D^{20}$ 1.4420 were obtained.

At the end of the reaction period of 86 hours the catalyst in the pressure reactor consisted of 75.9% by weight of [$H_3O$][$BF_4$], 0.3% by weight of HF and 23.8% by weight of $H_2O$. The losses of catalyst per 1 kg. of synthetized trimethylacetic acid amounted to 1.8 g. of [$H_3O$][$BF_4$] and 0.4 g. of HF.

*Example 5*

In the pressure reactor 1 described above in connection with the drawing 630 g. of catalyst consisting of 76.4% by weight of [$CH_3OH_2$][$BF_4$] and 23.6% by weight of methanol, within a reaction period of 26 hours 3,240 kg. (28.9 mols) of 2-ethylhexene-1, 2,160 kg. n-heptane, 0.690 kg. of $CH_3OH$ and 0.004 kg. of HF are continuously introduced at 40–50° C. and under 130–150 atmospheres CO-pressure. During said period of 26 hours 6.805 kg. ester-solution in n-heptane are continuously discharged and subjected to washing with feed methanol in order to recover catalyst and HF carried over from the pressure reactor.

Processing the synthesis product in a manner analogous to that described in the above Example 1, yielded 3,784 kg. (i.e. 22.0 mols, corresponding to 76.1% by weight of the theory) of the pure methylester of α-methyl-α-ethylcaproic acid having a B.P.$_{20}$ 81° C., VZ 324, $n_D^{20}$ 1.4211. Additionally, 1.931 kg. of n-heptane and 0.252 kg. unchanged 2-ethylhexene-1 were recovered. 0.334 kg. of olefine polymerizates were recovered as the distillation residue. The catalyst losses amounted to 3.3 g. of [$CH_3OH_2$][$BF_4$] per 1 kg. of the synthetized ester.

It will be appreciated that in the manner described in connection with the appended drawing aliphatic mono-olefins branched at the double bond and having $C_4$ to $C_{12}$ carbon atoms in the molecule, such as for example isobutylene, 2-methylpentene-1, 1,2-ethylhexene-1, trimer-propylene, tetramerpropylene, can be very easily and practically quantitatively converted into carboxylic acids having one more carbon atom in the molecule than the olefin, with high yield per unit of reaction space and time.

The fully continuous process, in which a small amount of stationary catalyst remaining in the reactor is used requires an instantaneous course of the synthesis reactions, i.e.

(a) Addition of the proton by the oxonium-ion to the double bond of the olefins

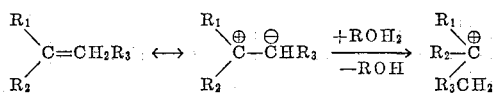

and (b) Re-formation of the oxonium-ion in the action of ROH on the acyl-ion

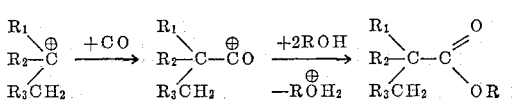

In carrying out the invention, the catalyst is used in aqueous solution of 74 to 85% by weight of the hydroxoniumtetrafluoroborate [$H_3O$][$BF_4$] and in methanol solution of 65 to 79% by weight of the methoxoniumtetrafluoroborate [$CH_3OH_2$][$BF_4$]. It was found that weak hydrolysis or solvolysis of the catalyst can be prevented by the addition of some HF (less than 1% by weight of the [$ROH_2$][$BF_4$]).

The addition of a solvent, such as heptane, to the catalyst solution is of advantage. In carrying out the synthesis according to the invention, e.g., with easily polymerizable $C_4$-, $C_6$-olefins, dilution by the solvent reduces polymerization of the olefins. In the synthesis of carboxylic acid esters dilution of the catalyst solution with heptane or the like essentially contributes to the necessary separation of phases in the reactor. It will be understood, however, that the synthesis processes embodying the invention can be carried out also in the absence of solvents.

In addition to the olefins used in the above examples the syntheses embodying the present invention can be carried out also with other olefins of the above described type having 4 to 12 C atoms in the molecule, in a manner and under conditions substantially equal to those described above.

In washing the crude synthesis product aqueous NaCl-solutions of 5 to 20% concentration are preferably used.

In carrying out the present invention, the catalyst is used in a mol ratio of catalyst:olefin, which is lower than the stoichiometric amount relative to the olefin, preferably less than 1:10. The lower limit of this molecular ratio is 1:100. The use of a diluent, e.g., heptane, is of advantage, because it promotes separation of phases in the reactor and reduces polymerization of easily polymerizable lower olefins containing in the molecule $C_4$ to $C_6$ carbon atoms. Instead of heptane other paraffin hydrocarbons, e.g., n-hexane, can be used, preferably up to an amount equal to that of the olefin charged. The abbreviation "B.P." stands for boiling point, and the abbreviation VZ stands for saponification number. The parts and percent are by weight if not otherwise stated.

What is claimed is:

1. A process for the synthesis of aliphatic carboxylic acids having from 5 to 13 carbon atoms in the molecule and aliphatic carboxylic acid methyl esters having from 6 to 14 carbon atoms in the molecule, comprising reacting in a reaction space an olefin selected from the group consisting of monolefins branched at the double bond and having from 4 to 12 carbon atoms in the molecule with CO and a reaction component selected from the group consisting of water and methanol, in the presence of a catalyst selected from the group consisting of aqueous solutions of 74–85% by weight of hydroxoniumtetrafluoroborate [$H_3O$][$BF_4$] and methanol solutions of 65–75% by weight of methoxoniumtetrafluoroborate [$CH_3OH_2$][$BF_4$]; the reaction being carried out in the range of 50 to 200 atmospheres pressure and a temperature in the range of 20 to 50° C.

2. A process as claimed in claim 1, in which the catalyst introduced into the reaction space remains in the reaction space during the reaction, and the reaction components introduced into the reaction space react to form the desired synthesis products, which are discharged from the reaction space.

3. A process as claimed in claim 2, in which the reaction components are continuously introduced into and the synthesis products are continuously discharged from the reaction space.

4. A process as claimed in claim 1, in which the molar proportion of catalyst to olefin by weight is lower than the stoichiometric amount relative to the olefin.

5. A process as claimed in claim 4, in which the molar proportion of catalyst to olefin by weight is at least 1% of the stoichiometric amount.

6. A process as claimed in claim 1, in which the synthesis is carried out in the presence of an organic, indifferent diluent.

7. A process as claimed in claim 6, in which the diluent is a liquid, paraffin hydrocarbon.

8. A process as claimed in claim 7, in which the diluent is heptane.

No references cited.

HENRY R. JILES, *Primary Examiner.*